United States Patent
Yu et al.

(10) Patent No.: US 12,334,703 B2
(45) Date of Patent: Jun. 17, 2025

(54) METHOD AND LASER FOR BREAKING LIMITATION OF FLUORESCENCE SPECTRUM ON LASER WAVELENGTH

(71) Applicants: Shandong University, Jinan (CN); Nanjing University, Nanjing (CN)

(72) Inventors: Haohai Yu, Jinan (CN); Huaijin Zhang, Jinan (CN); Yanfeng Chen, Jinan (CN); Fei Liang, Jinan (CN); Cheng He, Jinan (CN)

( * ) Notice: Subject to any disclaimer, the term of this patent is extended or adjusted under 35 U.S.C. 154(b) by 303 days.

(21) Appl. No.: 17/952,365

(22) Filed: Sep. 26, 2022

(65) Prior Publication Data

US 2023/0091773 A1   Mar. 23, 2023

Related U.S. Application Data

(63) Continuation-in-part of application No. PCT/CN2022/114666, filed on Aug. 25, 2022.

(30) Foreign Application Priority Data

Aug. 10, 2022 (CN) .......................... 202210959521.4

(51) Int. Cl.
*H01S 3/081* (2006.01)
*H01S 3/06* (2006.01)
(Continued)

(52) U.S. Cl.
CPC ........ *H01S 3/08018* (2013.01); *H01S 3/0621* (2013.01); *H01S 3/08059* (2013.01);
(Continued)

(58) Field of Classification Search
CPC .................... H01S 3/094092; H01S 3/0815
See application file for complete search history.

(56) References Cited

U.S. PATENT DOCUMENTS

| | | | |
|---|---|---|---|
| 2005/0041718 A1 | 2/2005 | Eisenbarth et al. | |
| 2011/0122900 A1 | 5/2011 | Sibbett | |
| 2014/0369371 A1 | 12/2014 | Kettler | |

FOREIGN PATENT DOCUMENTS

| | | | | |
|---|---|---|---|---|
| CN | 108923236 | * | 11/2018 | ............... H01S 3/30 |
| CN | 112054375 | * | 12/2020 | ........... H01S 3/0632 |

OTHER PUBLICATIONS

Gianluca Galzerano et al. ("Room-temperature diode-pumped Yb:KYF4 laser") Optics Letters vol. 31, Issue 22, pp. 3291-3293 (2006) (Year: 2006).*

(Continued)

*Primary Examiner* — Xinning(Tom) Niu
*Assistant Examiner* — Delma R Forde

(57) ABSTRACT

A method and a laser for breaking through the limitation of fluorescence spectrum on laser wavelength is disclosed. The method includes: exciting electrons to a high energy level by pump light, and suppressing an oscillation of radiation light by laser cavity coating, using a laser resonance to enhance a transition probability of an electron-phonon coupling from the high energy level to a multi-phonon coupling level, so as to realize the emission and enhancement of breakthrough fluorescence spectrum and realize the radiation light oscillation, wherein the laser cavity includes an incident mirror, a folding mirror, a tuning element and an exit mirror arranged in sequence along an optical path direction, the laser gain medium is located between an incident mirror and a folding mirror in the laser resonator, and the tuning element is arranged in the laser cavity at a Brewster angle.

2 Claims, 1 Drawing Sheet

(51) Int. Cl.
    *H01S 3/08*      (2023.01)
    *H01S 3/08018*   (2023.01)
    *H01S 3/0941*    (2006.01)
    *H01S 3/106*     (2006.01)
    *H01S 3/16*      (2006.01)
(52) U.S. Cl.
    CPC .......... *H01S 3/0815* (2013.01); *H01S 3/0941* (2013.01); *H01S 3/106* (2013.01); *H01S 3/1605* (2013.01); *H01S 3/1616* (2013.01); *H01S 3/1625* (2013.01); *H01S 3/1636* (2013.01); *H01S 3/1643* (2013.01); *H01S 3/1666* (2013.01)

(56) References Cited

OTHER PUBLICATIONS

Haohai Yu et a. ("Self-frequency-doubled visible Yb:YCOB lasers at the wavelengths of 523 and 570 nm" Lasers Congress 2016 (ASSL, LSC, LAC) © OSA 2016, pp. 1-3 (Year: 2016).*
Samanta et al. ("High-power, continuous-wave Ti:sapphire laser pumped by fiber-laser green source at 532 nm") vol. 50, Issue 2, Feb. 2012, pp. 215-219 (Year: 2012).*
Lauren Guillemot et al. ("Watt-level mid-infrared continuous-wave Tm:YAG laser operating on the 3H4 → 3H5 transition") Optical Materials 101 (2020) pp. 109745- through 109745-7 (Year: 2020).*

* cited by examiner

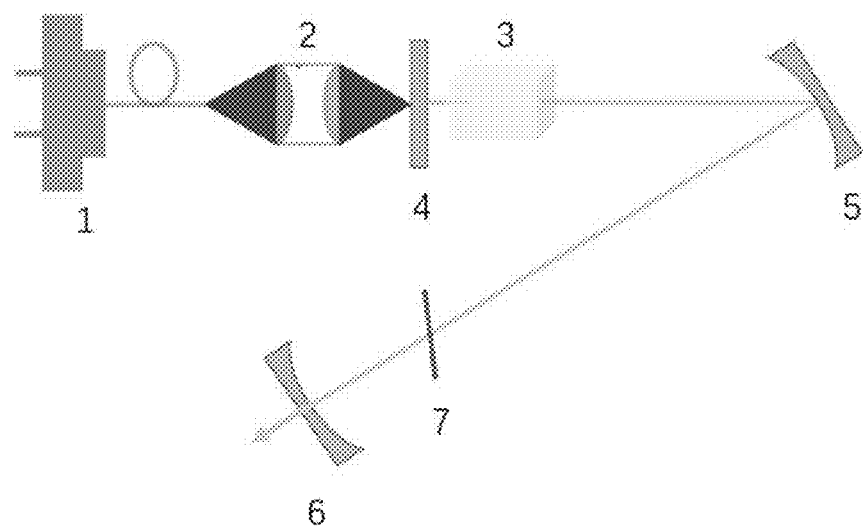

METHOD AND LASER FOR BREAKING LIMITATION OF FLUORESCENCE SPECTRUM ON LASER WAVELENGTH

This patent application is a continuation application of PCT/CN2022/114666, filed on Aug. 25, 2022, which claims the benefit and priority of Chinese Patent Application No. 202210959521.4, filed on Aug. 10, 2022, the disclosure of which is incorporated by reference herein in its entirety as part of the present application.

TECHNICAL FIELD

The present invention relates to the field of laser technology, and more particularly to a method and a laser for breaking the limitation of fluorescence spectrum on laser wavelength.

BACKGROUND ART

Laser, as an important artificial light source, plays an important role in key fields of national economy and national security. Different applications require different wavelengths of laser, and the available laser wavelength depends on the energy level difference of the electron transition. According to Bohr's hydrogen atom model, the energy level of electrons is quantized and discrete, and its spectrum can be broadened to a certain extent due to the influence of uniform and non-uniform broadening. The wavelength of the generated laser can be continuously adjusted in a certain range by the tunable laser technology. In order to expand the laser wavelength, nonlinear optics and frequency conversion technology have been developed. On the basis of the laser emission wavelength, the technology has been extended to many ultraviolet and infrared bands, which meets many practical application requirements. However, the basis of its expansion is still the wavelength of laser, and nonlinear optics and frequency conversion technology are based on the high-order response of electrons in materials to external light field, and the frequency conversion process depends on the nonlinear polarizability of materials. The polarizability is often several orders of magnitude smaller than the linear polarizability, which requires a larger power density of the incident light field; the efficiency of nonlinear frequency conversion also depends on the influence and limitation of phase matching, walk-off, temperature, etc., which requires higher design and application of wavelength extension devices. Therefore, directly expanding the laser wavelength from the process of laser emission and realizing the quantum "cutting" of the electronic transition process have incomparable advantages over the nonlinear frequency conversion technology, at the same time, it can also provide a basic light source for nonlinear optics and frequency conversion technology, and further expand the laser wavelength.

However, as described in Bohr's hydrogen atom model, the quantum orbital of the electron determines the separation of the fluorescence spectrum and also limits the laser wavelength obtained. Therefore, how to break through the fluorescence spectrum limit to obtain a new wavelength laser has been a key technical problem in this field.

SUMMARY

In view of the above, the present invention provides a method and a laser for breaking through the limitation of fluorescence spectrum on laser wavelength to solve the technical problems in the background art.

To achieve the above purpose, the present invention provides the following technical scheme:

In one aspect, that present invention disclose a method of breaking the limit of a fluorescence spectrum on a laser wavelength, the method includes: in a laser gain medium, exciting electrons to a high energy level by pump light, and suppressing an oscillation of radiation light by laser cavity coating; at the same time, using a laser resonance to enhance a transition probability of an electron-phonon coupling from the high energy level to a multi-phonon coupling level, so as to realize the emission and enhancement of breakthrough fluorescence spectrum and realize the radiation light oscillation, wherein the laser cavity includes an incident mirror, a folding mirror, a tuning element and an exit mirror arranged in sequence along an optical path direction, the laser gain medium is located between an incident mirror and a folding mirror in the laser resonator.

Preferably, the laser gain medium transits electrons to high energy level under the excitation of pump light, specifically including:

focusing the pump light provided by the pump source by a focusing system and then injecting into the laser gain medium to excite the electron transition to the high energy level.

The laser resonance is used to enhance a transition probability of an electron-phonon coupling from high-energy level to a multi-phonon coupling level, so as to realize the emission and enhancement of penetrating fluorescence spectrum and the oscillation of radiation light, which specifically includes as follows.

When the pump light wavelength is 976 nm, the laser gain medium including a crystal of calcium rare earth borate doped with ytterbium ions with a concentration of 1 at %-30 at %, and the crystal surface of the laser gain medium is polished and plated with a dielectric film with a high transmittance in the wavelength range of 1000 nm-1500 nm;

The incident mirror is plated with a dielectric film A which is highly transmissive to the wavelength band of 900 nm-1100 nm and is highly reflective to 1100 nm-1500 nm;

The folding mirror is plated with a dielectric film B which is highly transmissive to the wavelength band of 900 nm-1100 nm and total reflective to 1100 nm-1500 nm;

The exit mirror is plated with a dielectric film C which is highly transmissive to the wavelength band of 900 nm-1100 nm and partial reflective to 1100-1200 nm; or plated with a dielectric film C which is highly transmissive to the wavelength band of 900 nm-1200 nm and partial reflective to 1200 nm-1300 nm, or plated with a dielectric film C which is highly transmissive to the wavelength band of 900 nm-1400 nm and partial reflective to 1400 nm-1500 nm.

suppressing an oscillation of radiation light by laser cavity coating, at the same time, using a laser resonance to enhance a transition probability of an electron-phonon coupling from the high energy level to a multi-phonon coupling level, so as to realize the emission and enhancement of breakthrough fluorescence spectrum and realize the radiation light oscillation, further including:

when the pump light wavelength is 532 nm, the laser gain medium includes a Ti sapphire crystal having a doping concentration of 0.1 at %-5 at %, the crystal surface of the laser gain medium is polished and incident light is incident on the crystal surface of the laser gain medium at a Brewster angle;

The incident mirror is plated with a dielectric film A which is highly transmissive to the wavelength band of 500-1100 nm and highly reflective to 1100-1500 nm;

The folding mirror is plated with a dielectric film B which is highly transmissive to the wavelength band of 500-1100 nm and total reflective to 1100-1500 nm;

The exit mirror is plated with a dielectric film C which is highly transmissive to the wavelength band of 500-1100 nm and partial reflective to 1100-1200 nm; or plated with a dielectric film C which is highly transmissive to the wavelength band of 500-1200 nm and partial reflective to 1200-1300 nm, or plated with a dielectric film C which is highly transmissive to the wavelength band of 500-1400 nm and partial reflective to 1400-1500 nm.

wherein, suppressing an oscillation of radiation light by laser cavity coating, at the same time, using a laser resonance to enhance a transition probability of an electron-phonon coupling from the high energy level to a multi-phonon coupling level, so as to realize the emission and enhancement of breakthrough fluorescence spectrum and realize the radiation light oscillation, further including:

when the wavelength of the pump light is 795 nm, the laser gain medium includes yttrium aluminum garnet crystal with thulium doping concentration of 0.1 at %-20 at %, and the crystal surface of the laser gain medium is polished and plated with a dielectric film with high transmission to wavelength band of 795 nm and 1800-2100 nm;

The incident mirror is plated with a dielectric film A which is highly transmissive to the wavelength band of 795 nm and 1800-2100 nm and high reflective to 2100-2500 nm;

The folding mirror is plated with a dielectric film B which is highly transmissive to the wavelength band of 795 nm and 1800-2100 nm and total reflective to 2100-2500 nm;

The exit mirror is plated with a dielectric film C which is highly transmissive to the wavelength band of 795 nm and 1800-2100 nm and partial reflective to 2100-2500 nm.

In the other aspect, a laser for breaking the limitation of fluorescence spectrum on laser wavelength is disclosed. The laser includes a pumping source, an incident mirror, a laser gain medium, a folding mirror, a tuning element and an exit mirror arranged in sequence along an optical path direction. The pump source is used for emitting pump light, and the incident mirror, the folding mirror and the exit mirror form a laser resonator, the laser resonator is used for regulating and controlling the oscillation of radiated light when electrons transition from high energy level to low energy level, at the same time, laser resonance is used to enhance the transition probability of electron-phonon coupling from high energy level to multi-phonon coupling; the tuning element is arranged in the laser resonator at Brewster angle.

Preferably, the focusing system is further arranged between the pump source and the incident mirror.

Preferably, the tuning element includes a birefringence filter or prism.

Preferably, the surface of the laser gain medium is plated with a dielectric film with high transmission to a specific wavelength band.

Explanation of Terms of the Invention highly reflective is defined that the reflectivity of incident light with a specific wavelength or band is greater than 99%;

highly transmissive is defined that the transmittance of light with a specific wavelength or band is greater than 99%;

Partial reflective is defined that the reflectivity of light with a specific wavelength or band is between 80% and 99.9%.

According to the above technical scheme, the invention discloses a method and a laser for breaking through the limitation of fluorescence spectrum on laser wavelength, which have the following beneficial effects compared with the prior art:

According to the invention, the oscillation of radiated light when electrons transition from high energy level to low energy level is inhibited by using the coating regulation of the laser resonator, and the transition probability of electron-phonon coupling energy level is enhanced when electrons transition from high energy level to multi-phonon coupling, that is, by coating the surfaces of the incident mirror, folding mirror and exit mirror of the laser resonator with dielectric films with high transmission or high reflection or partial transmission in a specific wavelength band, and matching with laser gain media and tuning elements, the limitation of fluorescence spectrum can be broken through, and laser with new wavelength can be obtained.

BRIEF DESCRIPTION OF THE DRAWINGS

In order to more clearly explain the embodiments of the present invention or the technical solutions in the prior art, the following will briefly introduce the drawings that need to be used in the description of the embodiments or the prior art. Obviously, the drawings in the following description are only the embodiments of the present invention. For those of ordinary skill in the art, other drawings can be obtained according to the provided drawings without any creative effort.

The sole FIGURE is a schematic diagram of a laser structure provided by the present disclosure invention;

In the FIGURES: 1. pump source; 2. focusing system; 3. laser gain medium; 4. incident mirror plated with dielectric film A; 5. folding mirror plated with dielectric film B; 6. exit mirror plated with dielectric film C; 7. tuning element.

DETAILED DESCRIPTION OF THE EMBODIMENTS

In the following, technical solutions in the embodiment of the present invention will be clearly and completely described with reference to the accompanying drawings in the embodiment of the present invention, and it is obvious that the described embodiments are only a part of the embodiments of the present invention, but not all of the embodiments. Based on the embodiments of the present invention, all other embodiments obtained by those skilled in the art without making creative labor belong to the protection scope of the present invention.

On the one hand, the embodiment of the invention discloses a method for breaking through the limitation of fluorescence spectrum on laser wavelength. The method includes: in a laser gain medium, exciting electrons to a high energy level by pump light, and suppressing an oscillation of radiation light by laser cavity coating; at the same time, using a laser resonance to enhance a transition probability of an electron-phonon coupling from the high energy level to a multi-phonon coupling level, so as to realize the emission and enhancement of breakthrough fluorescence spectrum and realize the radiation light oscillation, wherein the laser cavity includes an incident mirror, a folding mirror, a tuning element and an exit mirror arranged in sequence along an optical path direction, the laser gain medium is located between an incident mirror and a folding mirror in the laser resonator.

The pump light can be provided by a pump source, and the pump light emitted by the pump source is focused by a focusing system and injected into a laser gain medium to excite the electron transition to a high energy level.

In that invention, through the physical effect of electron-phonon couple, a mode selection process of lase is utilized to realize excited radiation of electrons under the participation of multiple phonons, Therefore, it breaks through the traditional thinking and design thinking that the laser wavelength is limited by the fluorescent radiation envelope of the gain medium, and can be controlled by coating the laser cavity.

The method and process of the present invention will be described in detail through the following different embodiments:

Embodiment 1

The wavelength of the pump light emitted by the pump source is 976 nm, the pump source can be a semiconductor laser, the focusing system is composed of a pair of convex lenses with a focal length ratio of 1:1, the laser gain medium is a rare earth calcium borate crystal with a ytterbium ion doping concentration of 15 at %, and the surface of the crystal is polished and plated with a dielectric film with a high transmittance of 1000 nm to 1500 nm.

The laser resonator includes an incident mirror plated with a dielectric film A, a folding mirror plated with a dielectric film B, an exit mirror plated with a dielectric film C, and the incident mirror plated with a dielectric film A is highly transmissive to 900-1100 nm and highly reflective to 1100-1500 nm;

The folding mirror plated with dielectric film B is highly transmissive to 900-1100 nm and total reflective to 1100-1500 nm;

The exit mirror plated with a dielectric film C is highly transmissive to 900-1100 nm and partially reflective to 1100-1200 nm, the tuning element is a birefringent filter placed at Brewster's angle, and the tuned laser with wavelength from 1100-1200 nm can be output by rotating the tuning element.

If the exit mirror is replaced by plating a dielectric film C which is highly transmissive to 900-1200 nm and partially reflective to 1200-1300 nm, the tuned laser with wavelength of 1200-1300 nm can be output by rotating the tuning element.

If the exit mirror is replaced by plating a dielectric film C which is highly transmissive to 900-1300 nm and partially reflective to 1300-1400 nm, the tuned laser with a wavelength of 1300-1400 nm can be output by rotating the tuning element.

If the exit mirror is replaced by plating a dielectric film C which is highly transmissive to 900-1400 nm and partially reflective to 1400-1500 nm, the tuned laser with a wavelength of 1400-1500 nm can be output by rotating the tuning element.

Embodiment 2

The wavelength of the pump light emitted by the pump source is 532 nm, the pump source can be an all-solid-state laser, the focusing system is composed of a convex lens with a focal length of 50 mm, the laser gain medium is a Ti sapphire crystal with a doping concentration of 0.5 at %, and he surface of the crystal is polished and is placed in the resonant cavity with a Brewster angle.

The laser resonator includes an incident mirror plated with dielectric film A, a folding mirror plated with dielectric film B, an exit mirror plated with dielectric film C. The incident mirror plated with dielectric film A is highly transmitive to 500-1100 nm and highly reflective to 1100-1500 nm.

The folding mirror is plated with a dielectric film B which is highly transmissive to 500-1100 nm and total reflective to 1100-1500 nm.

The exit mirror is plated with a dielectric film C that is highly transmissive to 500-1100 nm and partially reflective to 1100-1200 nm, and the tuning element is a birefringent filter placed at a Brewster angle. The rotating element can realize the output of tuned laser with wavelength of 1100-1200 nm.

If the exit mirror is replaced by plating a dielectric film C which is highly transmissive to 500-1200 nm and partially reflective to 1200-1300 nm, the tuned laser with a wavelength of 1200-1300 nm can be output by rotating the tuning element; the exit mirror is replaced by plating a dielectric film C which is highly transmissive of 500-1300 nm and partially reflective to 1300-1400 nm, and the tuned laser with a wavelength of 1300-1400 nm can be output by rotating the tuning element.

If the exit mirror is replaced by plating a dielectric film C which is highly transmissive to 500-1400 nm and partially reflective to 1400-1500 nm, the tuned laser with a wavelength of 1400-1500 nm can be output by rotating the tuning element.

Embodiment 3

The pump light emitted by the pump source is 795 nm, the pump source is a semiconductor laser, the focusing system is composed of a pair of convex lenses with a focal length ratio of 1:1, the laser gain medium is an yttrium aluminum garnet crystal with a thulium doping concentration of 10 at %, The crystal surface is polished and plated with high permeability dielectric films at 795 nm and 1800-2100 nm;

the laser resonator consists of an incident mirror plated with a dielectric film A, a folding mirror plated with a dielectric film B, an exit mirror plated with a dielectric film C, and the incident mirror is plated with a dielectric film A which is highly transmissive to 795 nm and 1800-2100 nm and highly reflective to 2100-2500 nm.

The folding mirror is plated with a dielectric film B which is highly transmissive to 795 nm and 1800-2100 nm and total reflective to 2100-2500 nm.

The exit mirror is plated with a dielectric film C which is highly transmissive to 795 nm and 1800-2100 nm and partially reflective to 2100-2500 nm, the tuning element is a prism placed with a Brewster angle, and the rotating tuning element can realize tuning laser output from 2100-2500 nm.

Embodiment 4

The pump light emitted by the pump source has a wavelength of 1.6 μm, the pump source is a fiber laser, and the fiber diameter is 200 μm. The focusing system is composed of a pair of convex lenses with a focal length ratio of 1:1. The laser gain medium is a Cr:ZnS crystal with a doping concentration of $10^{18}$/cm$^3$, and the surface of the crystal is polished and plated with dielectric film which is highly transmissive to 1600 nm and 2400-2800 nm;

The laser resonator includes an incident mirror plated with dielectric film A, a folding mirror plated with dielectric film B and an exit mirror plated with dielectric film C.

The incident mirror is plated with a dielectric film A which is highly transmissive to 1600 nm and 2400-2800 nm and highly reflective to 2800-3000 nm.

The folding mirror is plated with a dielectric film B which is highly transmissive to 1600 nm and 2400-2800 nm and totally reflective to 2800-3000 nm;

The exit mirror is plated with a dielectric film C that is highly transmissive to 1600 nm and 2400-2800 nm and partially reflective to 2800-3000 nm. The tuning element is a prism placed at Brewster's angle, and the tuned laser with wavelength from 2800-3000 nm can be output by rotating the tuning element.

Embodiment 5

The wavelength of pump light emitted by the pump source is 1.0795 μm, and the pump source is Nd:YAP laser. The focusing system is composed of a convex lens with a focal length of 50 mm. The laser gain medium is NaCl(OH—):$F^{2+}$ color center laser crystal. The crystal is placed in a clear crystal chamber cooled by liquid nitrogen at Brewster angle. The crystal chamber is kept in vacuum, and the crystal surface is polished and plated with dielectric film which is highly transmissive to 1080 nm and 1400-1800 nm.

The laser resonator includes an incident mirror plated with dielectric film A, a folding mirror plated with dielectric film B and an exit mirror plated with dielectric film C. The incident mirror is plated with a dielectric film A which is highly transmissive to 1080 nm and 1400-1800 nm and high reflective to 1800-2000 nm.

The folding mirror is plated with a dielectric film B which is highly transmissive to 1080 nm and 1400-1800 nm and totally reflective to 1800-2000 nm;

The exit mirror is plated with a dielectric film C which is highly transmissive to 1080 nm and 1400-1800 nm and partially reflective to 1800-2000 nm. The tuning element is a prism placed at Brewster angle, and the rotating tuning element can realize the tunable laser output from 1800-2000 nm.

In the embodiment of the invention, the Brewster's angle placement of an element is defined that light rays are incident on the incident interface of the element at the Brewster's angle.

In the embodiment of the invention, dielectric film, dielectric film A, dielectric film B and dielectric film C are only used to distinguish dielectric films plated on different optical components.

As shown in the FIGURE, another aspect of the present invention discloses a laser for breaking through the limitation of fluorescence spectrum on laser wavelength. The laser includes a pump source 1, a focusing system 2, an incident mirror 4 plated with dielectric film A, a laser gain medium 3, a folding mirror 5 plated with dielectric film B, a tuning element 7 and an exit mirror 6 plated with dielectric film C, which are arranged in sequence along the optical path. The pump source 1 is used for emitting pump light of different wavelength bands, and the incident mirror 4 plated with dielectric film A, the folding mirror 5 plated with dielectric film B and the exit mirror 6 plated with dielectric film C form a laser resonator. The laser resonator is used to regulate and control the oscillation of radiated light when electrons transition from high energy level to low energy level, and at the same time, the transition probability of electron-phonon coupling energy level when electrons transition from high energy level to multi-phonon coupling is enhanced by laser resonance. The laser light reflected by the folding mirror 5 plated with dielectric film B enters the incident interface of the tuning element 7 at Brewster angle.

The tuning element 7 includes a birefringent filter or a prism.

In another embodiment, the surface of the laser gain medium 3 is plated with a dielectric film having high transmission to a specific wavelength band, so as to improve the passing efficiency of laser light.

In an embodiment, the gain medium is a laser gain medium having an electron-phonon coupling effect, It may be, but is not limited to, a single crystal or polycrystalline material that can provide lattice oscillation such as a laser crystal or laser ceramic doped with transition metals, rare earth luminescent ions, color centers, and the like.

In this specification, each embodiment is described in a progressive manner, and each embodiment focuses on the differences from other embodiments, and the same similar parts among the embodiments may be referred to each other. For the device disclosed in the embodiment, since it corresponds to the method disclosed in the embodiment, the description is relatively simple, and for the relevant points, refer to the description of the method part.

The foregoing description of the disclosed embodiments enables those skilled in the art to make or use the present invention. Various modifications to these embodiments will be apparent to those skilled in the art, and the general principles defined herein may be used without departing from the spirit or scope of the invention, In other embodiment implementing that. Accordingly, the present invention will not be limited to the embodiments shown herein, but will conform to the widest scope consistent with the principles and novel features disclosed herein.

What is claimed is:

1. A method for breaking a limitation of fluorescence spectrum on a laser wavelength, comprising:
   in a laser gain medium, exciting electrons to a high energy level by a pump light, and suppressing an oscillation of radiation light during electron transition from the high energy level to a low energy level by coating a laser resonator,
   at the same time, using a laser resonance to enhance a transition probability of an electron-phonon coupling from the high energy level to a multi-phonon coupling level, so as to realize an emission and enhancement of breaking through fluorescence spectrum and realize an oscillation of radiation light during electron transition from the high energy level to the multi-phonon coupling level,
   wherein the laser resonator comprises an incident mirror, a folding mirror, a tuning element and an exit mirror arranged in sequence along an optical path direction,
   the laser gain medium is located between the incident mirror and the folding mirror in the laser resonator,
   and the tuning element is arranged in the laser resonator at a Brewster angle;
   a wavelength of the pump light emitted by the pump source is 1.0795 μm, and the pump source is Nd:YAP laser, a focusing system is composed of a convex lens with a focal length of 50 mm, the laser gain medium is NaCl(OH—):$F^{2+}$ color center laser crystal, the crystal is placed in a clear crystal chamber cooled by liquid nitrogen at Brewster angle, the crystal chamber is kept in vacuum, and a crystal surface is polished and plated with dielectric film with high transmission to a wavelength band of 1080 nm and 1400-1800 nm;

the laser resonator comprises the incident mirror plated with dielectric film A with high transmission to the wavelength band of 1080 nm and 1400-1800 nm and high reflection to a wavelength band of 1800-2000 nm, the folding mirror plated with dielectric film B with high transmission to the wavelength band of 1080 nm and 1400-1800 nm and total reflection to the wavelength band of 1800-2000 nm, and the exit mirror plated with dielectric film C with high transmission to the wavelength band of 1080 nm and 1400-1800 nm and partial reflection to the wavelength band of 1800-2000 nm, the tuning element is a prism placed at Brewster angle, and the tuned laser with wavelength from 1800-2000 nm is output by rotating the tuning element.

2. A laser for breaking the limitation of fluorescence spectrum on laser wavelength, wherein the laser comprises a pump source, an incident mirror, a laser gain medium, a folding mirror, a tuning element and an exit mirror arranged in sequence along an optical path direction, wherein the pump source is configured to emit a pump light, and the incident mirror, the folding mirror and the exit mirror form a laser resonator; the laser resonator is configured to regulate and control an oscillation of radiated light when electrons transition from high energy level to low energy level, at the same time, laser resonance is used to enhance a transition probability of electron-phonon coupling from high energy level to multi-phonon coupling; the tuning element is arranged in the laser resonator at Brewster angle;

a wavelength of the pump light emitted by the pump source is 1.0795 μm, and the pump source is Nd:YAP laser, a focusing system is composed of a convex lens with a focal length of 50 mm, the laser gain medium is NaCl(OH—):$F^{2+}$ color center laser crystal, the crystal is placed in a clear crystal chamber cooled by liquid nitrogen at Brewster angle, the crystal chamber is kept in vacuum, and a crystal surface is polished and plated with dielectric film with high transmission to a wavelength band of 1080 nm and 1400-1800 nm;

the laser resonator comprises the incident mirror plated with dielectric film A with high transmission to the wavelength band of 1080 nm and 1400-1800 nm and high reflection to a wavelength band of 1800-2000 nm, the folding mirror plated with dielectric film B with high transmission to the wavelength band of 1080 nm and 1400-1800 nm and total reflection to the wavelength band of 1800-2000 nm, and the exit mirror plated with dielectric film C with high transmission to the wavelength band of 1080 nm and 1400-1800 nm and partial reflection to the wavelength band of 1800-2000 nm, the tuning element is a prism placed at Brewster angle.

* * * * *